US007541561B2

(12) United States Patent
Thyssen et al.

(10) Patent No.: US 7,541,561 B2
(45) **Date of Patent: *Jun. 2, 2009**

(54) PROCESS OF MICROWAVE HEATING OF POWDER MATERIALS

(75) Inventors: Jeffrey Reid Thyssen, Salem, MA (US); Laurent Cretegny, Niskayuna, NY (US); Daniel Joseph Lewis, Delmar, NY (US); Stephen Francis Rutkowski, Duanesburg, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/469,567

(22) Filed: Sep. 1, 2006

(65) Prior Publication Data

US 2008/0083748 A1 Apr. 10, 2008

(51) Int. Cl.
*H05B 6/64* (2006.01)
*B22F 1/00* (2006.01)
*B23K 1/19* (2006.01)

(52) U.S. Cl. ....................... 219/678; 419/31; 228/262.1

(58) Field of Classification Search ................. 219/678, 219/679; 228/262.2, 262.3, 262.4, 262.5, 228/262.6, 262.7, 262.8, 262.9; 419/31, 419/44

See application file for complete search history.

(56) References Cited

U.S. PATENT DOCUMENTS 3,824,457 A * 7/1974 Strongin et al. ............. 324/248
4,147,911 A * 4/1979 Nishitani .................... 219/756
5,154,779 A * 10/1992 Holcombe et al. .......... 148/207
5,294,264 A * 3/1994 Tiegs et al. ................. 148/207
5,321,223 A 6/1994 Kimrey, Jr. et al.
5,397,530 A 3/1995 Narasimhan et al.
5,736,092 A 4/1998 Apte et al.
5,740,941 A 4/1998 Lemelson
5,808,282 A 9/1998 Apte et al.
6,004,505 A 12/1999 Roy et al.
6,054,700 A * 4/2000 Rokhvarger et al. ......... 219/759
6,063,333 A 5/2000 Dennis
6,155,331 A 12/2000 Langer et al.
6,165,616 A 12/2000 Lemelson et al.
6,172,346 B1 1/2001 Wroe
6,183,689 B1 2/2001 Roy et al.

(Continued)

FOREIGN PATENT DOCUMENTS

EP 0456481 5/1991

(Continued)

*Primary Examiner*—Daniel L Robinson
(74) *Attorney, Agent, or Firm*—Penny A. Clarke

(57) ABSTRACT

A process for heating powder materials by microwave radiation so that heating and sintering or melting progressively and directionally occurs within the powder materials. The process generally entails forming a structure from a powder by arranging the powder in a mass according to size of particles of the powder so that the particles are progressively arranged within at least a region of the mass from smallest to largest. The mass is then subjected to microwave radiation so that the particles within the mass progressively couple with the microwave radiation according to size, the smallest particles coupling first and heating faster than larger particles of the powder, and the largest particles coupling last and heating slower than smaller particles of the powder. As a result of the progressive arrangement of the particles, the mass is progressively and directionally heated by the microwave radiation.

20 Claims, 2 Drawing Sheets

U.S. PATENT DOCUMENTS

| | | | | |
|---|---|---|---|---|
| 6,293,986 | B1 | 9/2001 | Rodiger et al. | |
| 6,512,216 | B2 | 1/2003 | Gedevanishvili et al. | |
| 6,610,241 | B2 | 8/2003 | Shrout et al. | |
| 6,805,835 | B2 | 10/2004 | Roy et al. | |
| 6,870,124 | B2 | 3/2005 | Kumar et al. | |
| 7,326,892 | B1 * | 2/2008 | Cretegny et al. | 219/679 |
| 2002/0106611 | A1 | 8/2002 | Bhaduri et al. | |
| 2006/0071053 | A1 | 4/2006 | Garimella | |

FOREIGN PATENT DOCUMENTS

| | | |
|---|---|---|
| EP | 1642666 | 5/2006 |
| WO | WO2004073037 | 8/2004 |

* cited by examiner

PROCESS OF MICROWAVE HEATING OF POWDER MATERIALS

BACKGROUND OF THE INVENTION

This invention generally relates to methods for heating powder materials, including processes and materials for use in the manufacturing and repair of superalloy components. More particularly, this invention relates to a process employing a powder material whose particle size and distribution promote heating and sintering or melting of the powder material by microwave energy.

Nickel, cobalt, and iron-base superalloys are widely used to form high temperature components of gas turbine engines. While some high-temperature superalloy components can be formed as a single casting, others are preferably or required to be fabricated by other processes. As an example, powder metallurgy (PM) techniques are used to form certain components of gas turbine engines, notable examples of which include turbine rotor disks. An advantage to using powdered metals is that forming operations, such as compression molding, can be used to form intricate molded part configurations with reduced need for additional machining operations. As a result, the formed part is often near-net-shape immediately after the forming operation. Another example of an alternative fabrication process involves joining operations, as in the case of high pressure turbine nozzle assemblies. Such joining operations are typically involve brazing techniques, which conventionally encompass joining operations performed at an elevated temperature but below the melting point of the metals being joined. In carrying out the brazing process, an appropriate braze alloy is placed between the interface (faying) surfaces to be joined, and the faying surfaces and the braze alloy therebetween are heated in a vacuum to a temperature sufficient to melt the braze alloy without melting or causing grain growth in the superalloy base material. The braze alloy melts at a lower temperature than the superalloy base material as a result of containing a melting point suppressant such as boron. On cooling, the braze alloy solidifies to form a permanent metallurgical bond.

During engine operation, gas turbine engine components are subject to strenuous high temperature conditions under which various types of damage or deterioration can occur. As examples, erosion and oxidation reduce wall thicknesses of turbine nozzles and vanes, and cracks can initiate at surface irregularities and propagate as a result of stresses that are aggravated by thermal cycling. Because the cost of components formed from superalloys is relatively high, it is often more desirable to repair these components rather than replace them. In response, brazing techniques have been developed for crack repair and wall thickness build-up that entail placing a braze alloy filler metal on the surface area requiring repair, and then heating the filler metal in a vacuum to above its melting point, but below that of the surface substrate, so that the molten filler metal wets, flows, and fills the damaged area.

While widely employed to fabricate and repair gas turbine engine components, conventional brazing processes have notable disadvantages. First, the entire component must be subjected to a vacuum heat treatment, which is a very lengthy process in a production environment, unnecessarily exposes undamaged regions of the component to high temperatures, and can potentially remelt joints in other sections of the component. Furthermore, the braze alloy typically comprises elements similar to the base metal of the component, but with the addition of melting point suppressants (e.g., boron, silicon, etc.) that reduce its melting point below the base metal solidus temperature, thereby significantly altering its mechanical properties. Microwave brazing has been investigated as a potential candidate for eliminating these issues, as heating can be localized to selected areas of a component. Two approaches have generally been proposed for microwave brazing. A first entails the use of a susceptor (e.g., SiC enclosure) that is heated when exposed to microwave energy and, in turn, transfers the heat to the component by radiation. Drawbacks to this approach are lack of local heating of the braze alloy only, as an entire region of the component is inevitably heated, and significant heat loss from radiation in directions away from the intended brazement. A second approach entails direct microwave heating of metallic powders, which are significantly more susceptible to absorbing microwave energy than bulk metals whose tendency is to reflect microwaves. However, typical braze alloy compositions do not couple sufficiently with microwave energy to be melted, with the result that the braze alloy powder is instead sintered and as a result has properties greatly inferior to the base metal of the component.

BRIEF SUMMARY OF THE INVENTION

The present invention generally provides a process for heating a powder material by microwave radiation so that heating of the powder material is selective and can be sufficient to cause complete melting of the particles as a result of the heating directionally progressing through the powder material.

The process of this invention generally entails forming a structure from a powder by arranging the powder in a mass according to particle size so that particles of the powder are progressively arranged within at least a region of the mass from smallest to largest in a direction of progression through the mass. The mass is then subjected to microwave radiation so that the particles within the mass progressively couple with the microwave radiation according to size, the smallest particles coupling first and heating faster than larger particles of the powder, and the largest particles coupling last and heating slower than smaller particles of the powder. Accordingly, as a result of the progressive arrangement of the particles, the mass is progressively and directionally heated by the microwave radiation. The microwave radiation is eventually interrupted to allow the mass to cool and form the structure.

According to the invention, the process described above can be carried out so that the mass is heated so as to partially or completely melt the particles, with the smallest particles melting first and the largest particles melting last, such that the mass is progressively and directionally melted by the microwave radiation and upon cooling forms a sintered structure (if only partial melting occurred) or a solidified structure (if complete melting occurred). As such, the process can be applied to various applications in which heating of a powdered material is desired, for example, the fabrication of sintered or fully consolidated powder metallurgy (PM) articles, the forming of coatings including the repair or build-up of a damaged surface, and the metallurgical joining of components such as by soldering or brazing. Because heating is by microwave radiation, the heating rate and melting of the powder particles is determined by particle size, instead of location relative to a heating source or relative to any surface contacted by the powder mass. This aspect of the invention enables a region of the powder mass formed of sufficiently small particles to melt prior to melting of a substrate contacted by the region. As a result, the powder particles can be formed of a material having the same melting temperature (for example, within 150° C.) as the substrate contacted by the powder mass. This aspect of the invention also enables the powder mass to contain powder particles with different melting temperatures to achieve certain processing capabilities. For example, microwave heating of a powder mass containing particles that are smaller and have a higher melting temperature than other particles within the mass can induce melting of the smaller high-temperature particles prior to melting of the larger low-temperature particles.

Other objects and advantages of this invention will be better appreciated from the following detailed description.

DETAILED DESCRIPTION OF THE INVENTION

The invention will be described with specific reference to processing of components for a gas turbine engine, including the fabrication, coating, and repair of such components with a braze material. However, the invention has application to a variety of components and materials other than those discussed, and such variations are within the scope of this invention.

Figure 1:
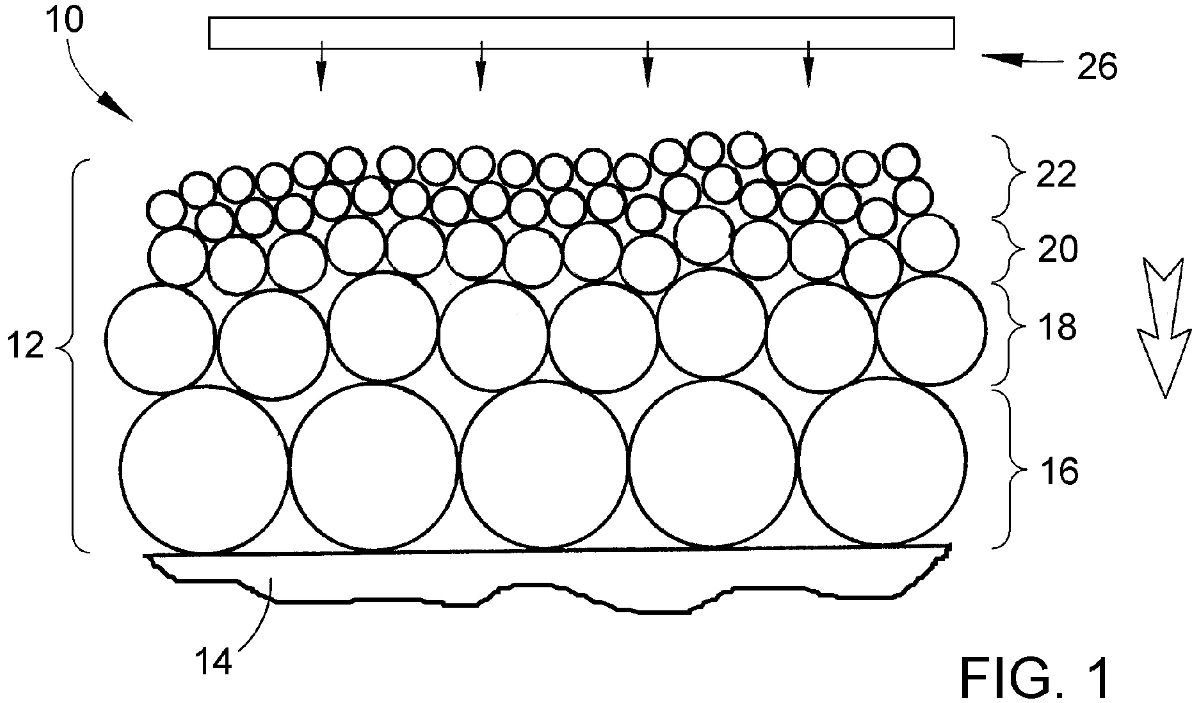
FIG. 1 schematically represents an arrangement of powder particles in a mass according to particle size for microwave heating of the mass to form a structure in accordance with an embodiment of the present invention.

FIG. 1 schematically represents a mass 10 of powder particles 12 contacting a surface of a substrate 14. As will become evident from the following, the substrate 14 may be a region of a gas turbine engine component to be coated, repaired, or joined to another component, or a portion of a mold in which the particles 12 have been placed. If a region of a gas turbine engine component, the substrate 14 may be formed of a superalloy, whose composition will depend on the particular type of component and its anticipated operating conditions. Various other metallic and nonmetallic materials are also possible for the substrate 14, and therefore within the scope of the invention.

The powder particles 12 can be formed of a variety of materials, limited only by the requirement that the particles 12 are capable of being heated when subjected to microwave radiation and are compatible with the material of the substrate 14 while at the maximum heating temperature. Materials capable of being heated when subjected to microwave radiation include pure metals (such as Ni, Ti, Al, Co, Cr, etc.), metallic alloys (such as superalloys, steels, braze compositions, etc.), and alloying additives (such as B, C, Hf, Zr, Si, etc.), though additions, mixing, and layering with other materials (such as polymeric, amorphous or ceramic materials) are also within the scope of the invention. A wide range of microwave frequencies could be used with the present invention, though regulations generally encourage or limit implementation of the invention to typically available frequencies, e.g., 2.45 GHz and 915 MHz, with the former believed to be preferred.

In an embodiment of the invention in which the substrate 14 is a region of a component to be coated, repaired, or joined to another component, the particles 12 are preferably formed of a material that is metallurgically compatible with the substrate 14. Compatibility is assured if the particles 12 have the very same composition as that of the substrate 14, though suitable compatibility can also be achieved if the particles 12 and substrate 14 do not have compositions prone to detrimental interdiffusion at elevated temperatures that would lead to loss of desired mechanical or environmental properties. For example, if formed of a metallic material the particles 12 preferably do not contain a melting point suppressant (such as boron or silicon) at such levels that would lead to an unacceptable loss of properties in the substrate 14 if a significant amount of the suppressant were to diffuse into the substrate 14 during heating of the particles 12 and later during the life of the substrate 14. As will be discussed in more detail below, the particles 12 are not required to have the same composition, but instead particles 12 of different compositions may be combined to form the powder mass 10.

FIG. 1 schematically represents the particles 12 as progressively layered or graded as a function of particle size, with the largest (coarsest) particles 16 contacting the substrate 14, the smallest (finest) particles 22 farthest disposed from the substrate 14, and intermediate-sized particles 18 and 20 therebetween. While four sizes of particles 12 are represented in FIG. 1, it should be understood that particles 12 of any number of different particle sizes could be used to form the powder mass 10. As used herein, the particles 12 are deemed to be progressively layered as a function of particle size if each group of particles 12 of essentially the same size are present in a visually perceptible layer, whereas grading is intended to mean that a more uniform and gradual particle size distribution is present without visually discernible layers.

According to the invention, the progressive particle size distribution in the powder mass 10 facilitates a progressive coupling of microwave energy 26 with the powder mass 10, in which the smallest particles 22 couple first and most readily with the microwave energy 26 so as to be heated by the microwave energy 26 at a faster rate, and the largest particles 16 couple last and less readily with the microwave energy 26 so as to be heated by the microwave energy 26 at a relatively slower rate. During exposure of the layered or graded mass 10 to the microwave energy 26, this progressive particle size distribution produces a progression or directionality of heating that follows the progression of particle size, as indicated by the arrow in FIG. 1. This heating progression can be implemented to perform a variety of thermal treatments, including sintering and partial or complete melting of the particles 12. The microwave energy 26 is eventually interrupted to allow the mass 10 to cool and form the desired sintered or solidified structure.

In view of the above, it can be appreciated that progressive and directional heating in this manner can be used to cause directional melting to occur based on particle size distribution in the mass 10, instead of the conventional mechanism of absorbing convective and/or radiant heat at the exterior surface of the mass 10 and subsequent conduction through the mass 10 toward its interior. As such, the heating process performed by this invention can be achieved without any assistance from convective or radiant heating, such as susceptors used in the past. As known in the art, metallic powders are significantly more susceptible to microwave heating by absorbing microwave energy than bulk metals, which reflect microwave radiation. By localizing particles 12 of sufficiently small size (e.g., particles 22) to effectively couple with the applied microwave energy 26, partial or complete melting can be initiated in the particles 22, with heating from the continuing microwave energy 26 and resultant molten particles combining to cause the adjacent and slightly larger particles (e.g., 20) to partially or completely melt, with this process directionally progressing through the mass 10 toward the largest particles 16. In this manner, whereas microwave energy has been typically limited to sintering braze alloy powders, the process of the present invention is believed to be capable of fully melting braze alloy powders.

As previously noted, while all particles 12 may be formed to have the same composition, it is also possible to have a variation in the composition of the particles 16, 18, 20, and 22, for example, different compositions for different sizes of particles 16, 18, 20, and 22, and/or different compositions for particles 16, 18, 20, and 20 of the same size. Such an approach could be used, for example, to place particles 12 of a highly susceptible material at the surface of the substrate 14 (e.g., the particles 16 in FIG. 1) that would further accelerate the heating rate, transmitting heat to the sub-layers that, in turn, would become more susceptible due to increased temperature (since metal susceptibility to microwave radiation increases with temperature). This approach could also be used to provide different properties through the thickness of the resulting structure. For example, an outermost layer formed by the outermost layer of particles 12 (e.g., the layer formed by particles 22 in FIG. 1) could be rendered more resistant to oxidation resistance than the sublayers of the resulting structure by forming the outermost particles 12 of an appropriate oxidation-resistant material.

Because bulk metals such as the substrate 14 tend to reflect microwave radiation, the present invention makes possible the brazing of a superalloy substrate 14 with alloys having, in addition to melting temperatures below that of the superalloy, an alloy having the very same composition as the substrate 14, as well as alloys with the same or even higher melting point as the substrate 14. For example, a nickel-base superalloy component can be joined, coated, or repaired with a braze material of the same nickel-base superalloy composition or another nickel-base alloy, in other words, an alloy whose base metal is the same as the base metal of the substrate 14. In this manner, degradation of the properties of the substrate 14 resulting from interdiffusion with the braze material can be essentially if not entirely avoided. In view of the capability of melting particles 12 formed of an alloy having a melting point above that of the substrate 14, it should be appreciated that the term "brazing" as used herein is not limited to the conventional limitation of a joining operation performed at a temperature below the melting point of the metals being joined.

As noted above, the present invention can be implemented in the fabrication of articles by powder consolidation and in the coating, repair, or build-up of a surface of an article. For example, a freestanding sintered article can be produced by directionally heating the mass 10 of particles 12 to a sufficient temperature to cause directional sintering of the particles 12. Alternatively, higher temperatures can be induced to cause directionally heating the mass 10 to a sufficient temperature to cause directional melting of the particles 12, which on solidification can yield a dense freestanding PM article. In either of these scenarios, the substrate 14 would likely be a mold with which the particles 12 do not metallurgically bond, and the particles 12 would preferably undergo consolidation under pressure to promote densification of the article. Another example of implementing this invention is to use the mass 10 of FIG. 1 to form a braze repair or coating on the surface of the substrate 14, in which case it is desired that the resulting structure formed by the powder mass 10 metallurgically bonds to the substrate 14.

As represented in FIG. 1, the smallest particles 22 can be located at the exterior of the mass 10 so that the smallest particles 22 are located farthest from the substrate 14, particle size increases toward the center of the mass 10, and directional heating and melting are initiated away from the substrate 14 and progress in a single direction through the mass 10 toward the substrate 14. Such an outside-in progression may be particularly desirable in cases where minimal or controlled interaction (interdiffusion) and/or melting is desired for the substrate 14. An example is a thin layer of an oxidation resistant material, such as an MCrAlX overlay coating (where M is Ni, Co, and/or Fe and X is yttrium and/or a rare earth and/or reactive element) widely used in aerospace applications. Particles 22 of an MCrAlY alloy can be caused to melt and consolidate above the substrate 14, with minimal diffusion with substrate 14 to avoid formation of deleterious phases in an interdiffusion zone that forms between the substrate 14 and the resulting coating.

Figure 2:
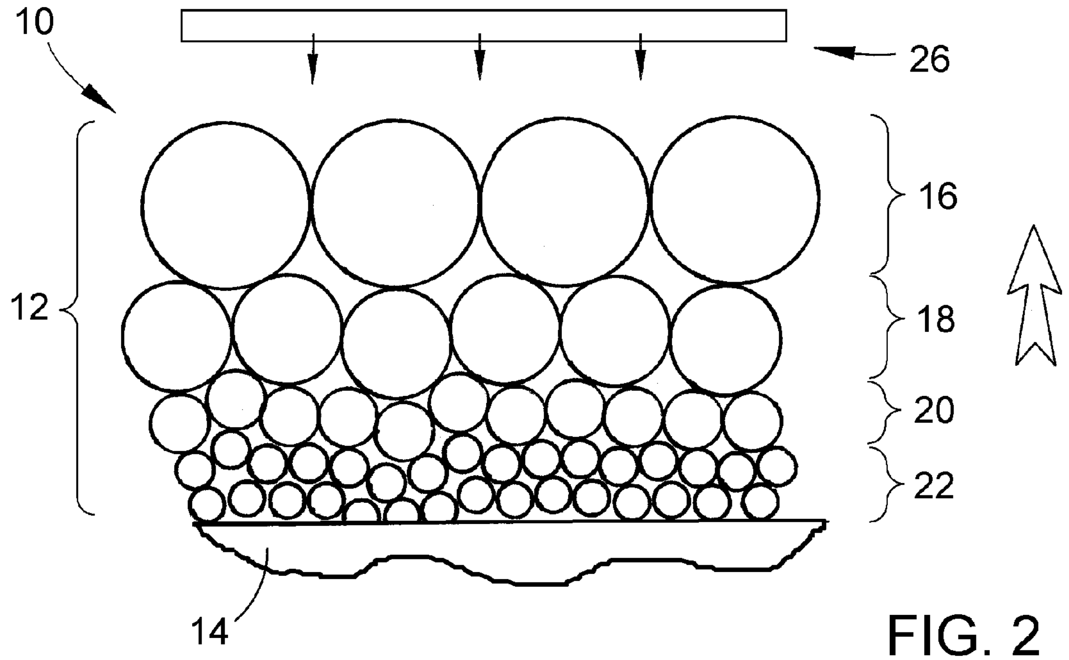
FIG. 2 schematically represents an arrangement of powder particles in a mass similar to FIG. 1, but with a particle size arrangement opposite that of FIG. 1 in accordance with another embodiment of the present invention.

Alternatively, an inside-out progression can be achieved. For example, the smallest particles 22 can be located within the interior of the mass 10 and the largest particles 16 at the exterior of the mass 10, so that particle size increases in all directions toward the outer surfaces of the mass 10 and directional melting progresses in all directions from the interior of the mass 10 toward the surfaces of the mass 10. Another option represented in FIG. 2 is to locate the smallest particles 22 adjacent the substrate 14 so that heating and melting are initiated adjacent the substrate 14 and progress in a single direction through the mass 10 away from the substrate 14. An application for this approach is where different materials are layered on the substrate 14, and it is desired that the innermost layer melt first before being sealed off by the outermost layer, as may be the case with a multilayer coating having a more oxidation-resistant outer layer. In cases where the substrate 14 is sufficiently large to behave as a heat sink, locating the smallest particles 22 against the substrate 14 will also have the effect of causing solidification to follow the same directional progress as melting, providing directional solidification that initiates at and progresses away from the substrate 14. A notable application for this is the build-up of material on a single-crystal or directionally-solidified material, such as a cast turbine blade. The particular microstructure of the substrate 14 will be induced in the structure formed by the mass 10 as a result of epitaxial growth.

In view of the above, it should be appreciated that the invention can be readily used to achieve directional solidification of a molten mass on a wide variety of substrates, and such a result may be of particular interest to the application. Directional solidification will occur in many cases (e.g., the arrangements of FIGS. 1 and 2) because of the thermal gradient provided by the substrate 14, which is not directly heated by the microwave process. For the case represented in FIG. 2 in which the smallest powder particles 22 are located against the substrate 14 and the largest powder particles 16 are located at an outer surface/layer of the mass 10 farthest from substrate 14, the following succession of events will take place. Heating and melting will initiate within the inner region of the mass 10 defined by the smallest particles 22 contacting the substrate 14, and progress toward the outer region of the mass 10 containing the largest particles 16 farthest from the substrate 14. As the outer region melts, the inner region is cooled by the substrate 14, which acts as a heat sink for the molten particles 22 and creates a steep thermal gradient. As a result, the molten inner region contacting the substrate 14 starts to solidify first, and solidification progresses away from the substrate 14 in essentially the same path taken by the melting process. As noted above, a significant advantage of directional solidification achieved with the invention is the ability to induce epitaxial growth within the molten mass 10 when applied to a single-crystal or directionally-solidified material, such as a superalloy, in which case the repair, coating, or build-up produced with the powder mass 10 has the same crystallographic characteristics as the substrate 14.

Notably, if powders of two or more different compositions with different melting points are appropriately arranged in the mass 10 and subjected to microwave energy 26, the progression of heating and melting through the mass 10 would not necessarily follow what would ordinarily be dictated by a uniform heating rate and inherent melting points based alone on the chemistry of the particles 12. For example, relatively smaller particles (e.g., particles 18, 20, and/or 22) formed of an alloy with a relative high melting point could be caused to melt sooner than relatively larger particles (e.g., particles 16, 18, and/or 20) with a lower melting point. Potential applications for using powders of two or more different compositions include coatings formed of metallic, ceramics, and/or composites. Adjusting the particle sizes for different constituents of a coating can be used in numerous applications, examples of which include: wear coatings with hard particles (e.g., CrC or WC) in a metal alloy (e.g., Co-based) matrix that is preferentially molten; inclusion of a polymeric material to reduce weight, adjust porosity, and/or alter abrasion characteristics of the coating; abradable ceramic coatings (e.g., turbine blade applications) in a lower melting point matrix material; and combinations of metallic and ceramic coatings, in which a first layer of fine metallic powder of an alloy with high oxidation resistance is deposited under a second layer of ceramic powder that, once consolidated, provides additional oxidation resistance or thermal protection.

Figure 3:
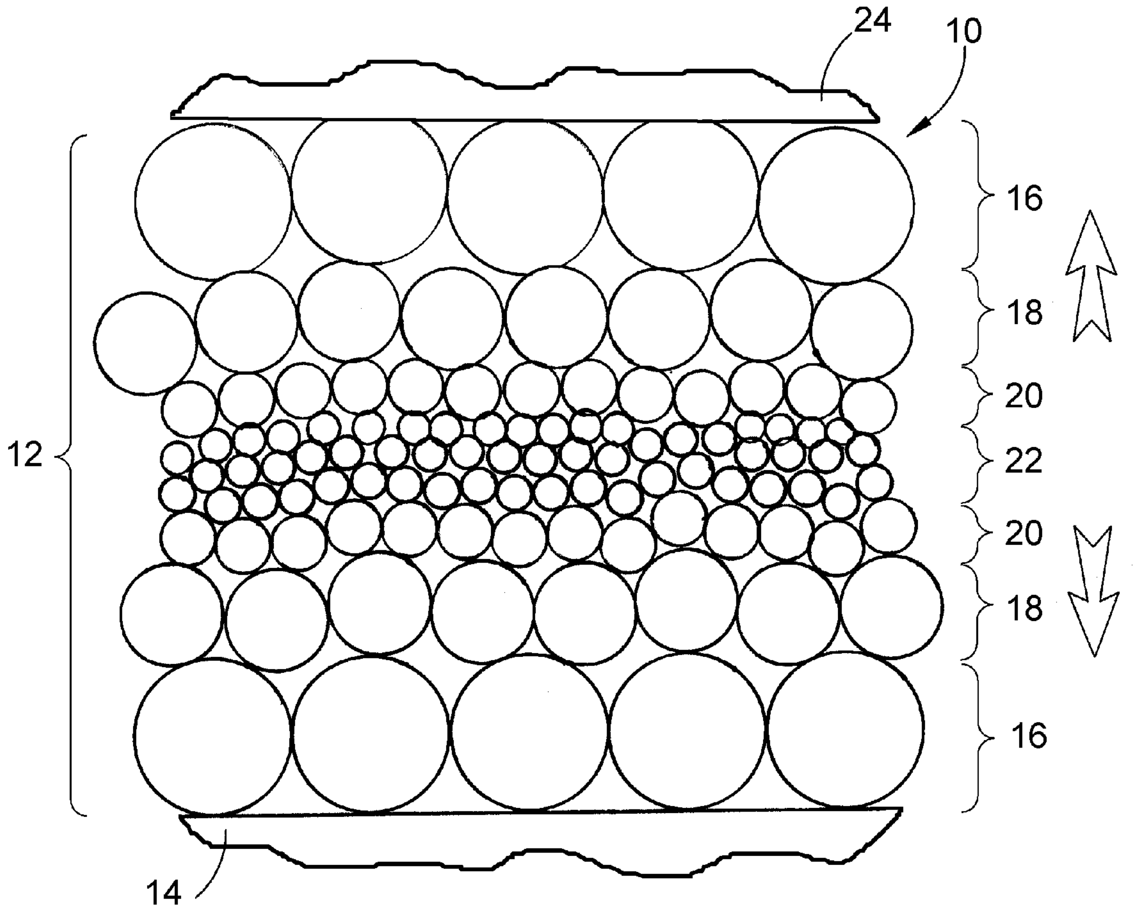
FIG. 3 schematically represents an arrangement of powder particles in a mass according to particle size for microwave heating of the mass to bond two surfaces together in accordance with another embodiment of the present invention.

As represented in FIG. 3, a powder mass 10 of this invention may also be used to metallurgically join the substrate 14 to a second substrate 24 by providing between the substrates 14 and 24 a braze material containing particles 12 arranged to have a layered or graded particle size distribution similar to those described for FIGS. 1 and 2. In FIG. 3, the largest particles 16 contact both substrates 14 and 24 and the smallest particles 22 are approximately equidistant therebetween. In this embodiment, the particles 12 may be contained within a binder, in which case each set of particles 16, 18, 20, and 22 may be contained in a separate binder layer, such as in the form of a tape or laminate that can be individually applied to one of the substrates 14 and 24. Again, some or all of the particles 12 may have a melting temperature equal to or even greater than that of either or both substrates 14 and 24. Furthermore, the substrates 14 and 24 can be formed of the same or dissimilar materials, including metallic to metallic materials, metallic to ceramic materials, or even ceramic to ceramic materials.

It will be understood that processes associated with sintering and brazing are preferably preformed in an inert or low pressure atmosphere to minimize oxidation of the metallic particles 12 and any surfaces (e.g., substrates 14 and 24) to which the particles 12 are bonded. Furthermore, it should be understood that suitable and preferred sizes for the particles 12 will depend on the particular application, temperatures, and materials involved. Generally speaking, it is believed that a maximum particle size will be on the order of about 100 mesh (about 150 micrometers), whereas minimum particle sizes can be as little as nanoscale-sized, e.g., less than 100 nanometers such as on the order of about 10 nanometers.

While the invention has been described in terms of particular embodiments, it is apparent that other forms could be adopted by one skilled in the art. Accordingly, the scope of the invention is to be limited only by the following claims.

The invention claimed is:

1. A process of forming a structure from at least a first powder of at least a first material, the process comprising:

arranging the first powder in a mass according to size of particles of the first powder so that the particles are progressively arranged within at least a region of the mass from smallest to largest to define a direction of progression through the mass;

subjecting the mass to microwave radiation so that the particles within the mass progressively couple with the microwave radiation according to size, the smallest particles coupling first and heating faster than larger particles of the first powder, and the largest particles coupling last and heating slower than smaller particles of the first powder, such that as a result of the progressive arrangement of the particles the mass is progressively and directionally heated by the microwave radiation in the direction of progression through the mass; and then interrupting the microwave radiation and allowing the mass to cool and form the structure.

2. The process according to claim 1, wherein the mass is heated so as to sinter the particles and the mass is a sintered body on cooling.

3. The process according to claim 1, wherein the mass is heated so as to completely melt the particles and the mass is a solidified body on cooling.

4. The process according to claim 3, wherein the mass contacts a substrate so that the direction of progression through the mass is away from the substrate, and cooling of the mass is by directional solidification initiating at the substrate so that the mass is progressively and directionally solidified in the direction of progression.

5. The process according to claim 4, wherein solidification of the mass is epitaxial so that the structure has the same crystallographic characteristics as the substrate.

6. The process according to claim 3, wherein the first powder is arranged on a substrate and the structure is metallurgically bonded to the substrate as a result of the melting of the particles and cooling of the mass.

7. The process according to claim 6, wherein the structure metallurgically bonds the substrate to a second substrate as a result of the melting of the particles and cooling of the mass.

8. The process according to claim 6, wherein the structure is a coating on the substrate as a result of the melting of the particles and cooling of the mass.

9. The process according to claim 6, wherein the structure is a coating on the substrate as a result of the melting of the particles and cooling of the mass.

10. The process according to claim 6, wherein the first material and the substrate have substantially the same melting temperature.

11. The process according to claim 10, wherein the first material and the substrate are superalloys.

12. The process according to claim 3, wherein the first powder is arranged in a mold and consolidated within the mold while subjected to the microwave radiation to form a powder metallurgy body as a result of the melting of the particles and cooling of the mass.

13. The process according to claim 1, wherein the first material is a metallic material.

14. The process according to claim 1, wherein the particles within the mass are progressively layered in the direction of progression through the mass as a function of particle size.

15. The process according to claim 1, wherein the particles within the mass are progressively graded in the direction of progression through the mass as a function of particle size.

16. The process according to claim 1, wherein heating of the mass occurs without assistance from convective or radiant heating means.

17. The process according to claim 1, wherein the first powder of the first material is arranged in the mass along with a second powder of a second material, and the first material has a lower melting temperature than the second material.

18. The process according to claim 17, wherein the mass is heated so as to melt the particles of the first and second powders, and wherein at least some particles of the second powder are smaller in size than the largest particles of the first powder and melt before the largest particles of the first powder.

19. The process according to claim 1, wherein the particles are arranged throughout the mass from smallest at one surface of the mass to largest at an opposite surface of the mass, and the mass is directionally heated from the one surface to the opposite surface when subjected to the microwave radiation.

20. The process according to claim 1, wherein the particles are arranged within the mass from smallest within an interior region of the mass to largest at an exterior surface of the mass, and the mass is directionally heated from the inside out when subjected to the microwave radiation.

* * * * *